United States Patent Office 3,456,288
Patented July 22, 1969

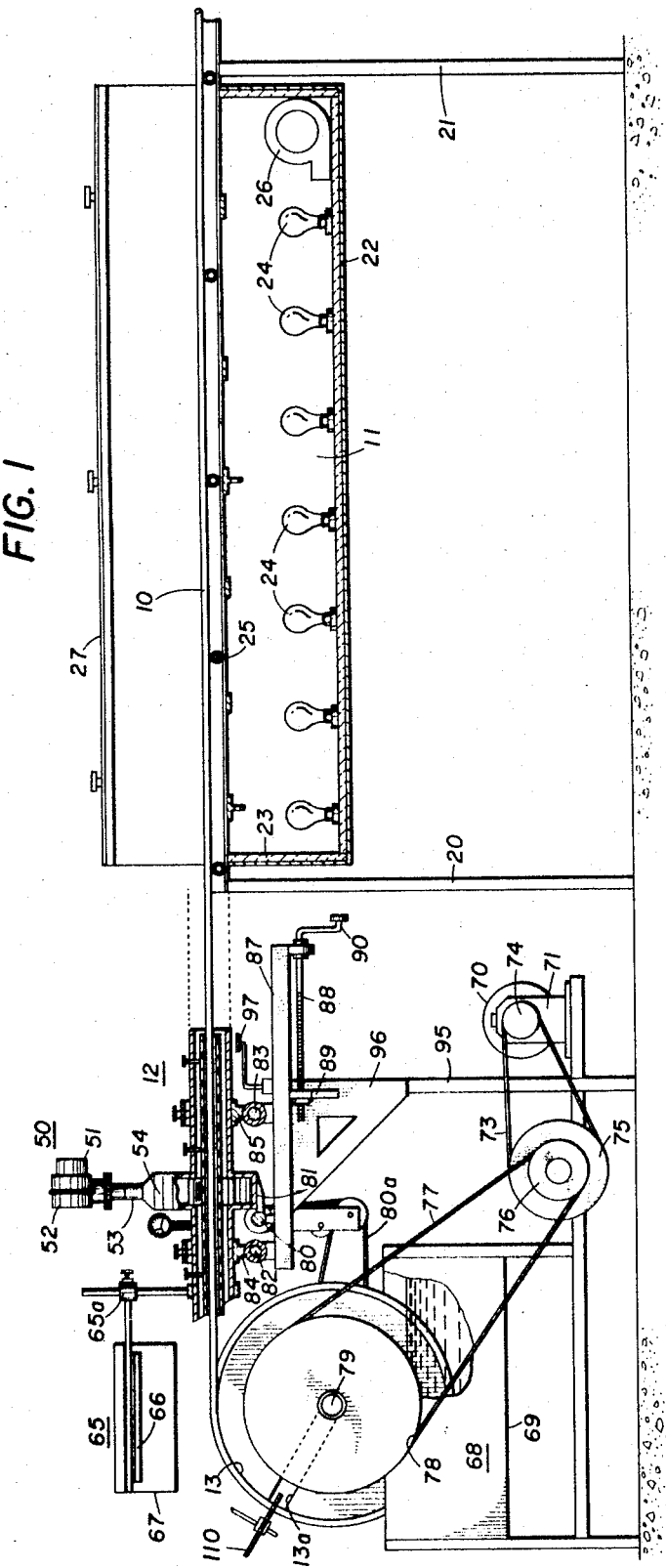

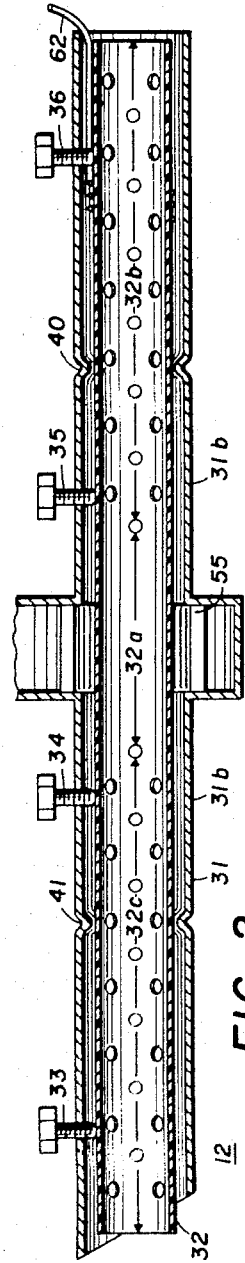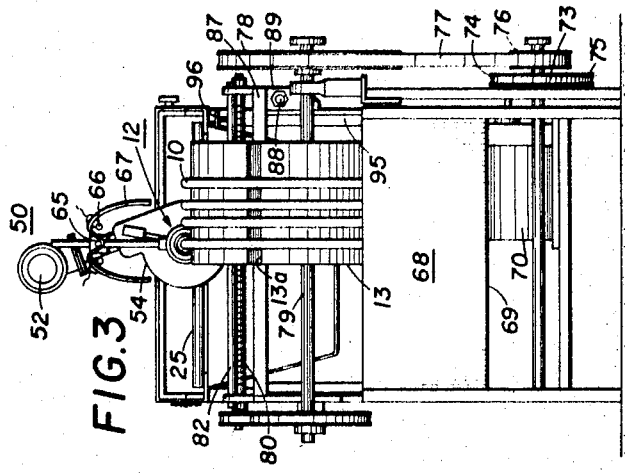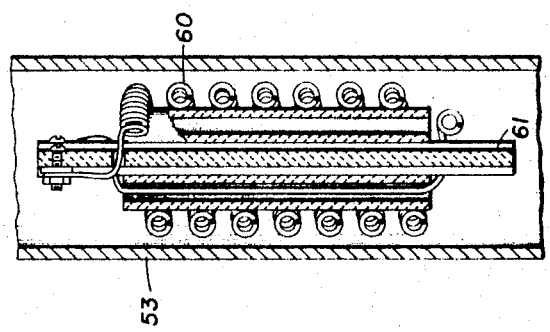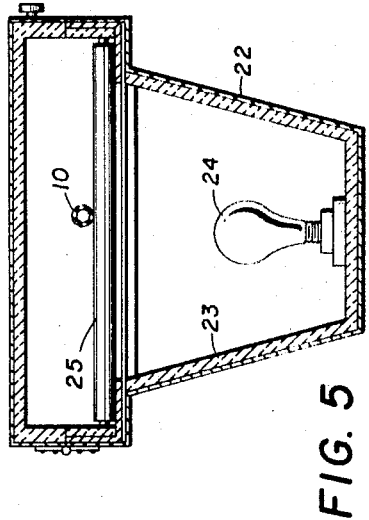

3,456,288
PRE-SHRUNK WHEEL BALANCER RING AND SYSTEM FOR FORMING SAME
Beauford I. Whitlock, Stafford, Kans., assignor to AWB Manufacturing Co., Inc., Stafford, Kans., a corporation of Kansas
Filed Oct. 1, 1965, Ser. No. 492,175
Int. Cl. B29c 27/00
U.S. Cl. 18—1      7 Claims

ABSTRACT OF THE DISCLOSURE

Plastic tubing stock formed into rings by preheating in an oven and a heater tube at the oven output leading to a drum where the zone in which the stock engages the drum is subject to heat radiation with a cooling liquid bath encompassing the lower section of the drum.

---

This invention relates to the production of a dynamic wheel balancing ring of a plastic material in such finished form that it will not become deformed during use by further shrinkage. In a more specific aspect, the invention relates to a method and system for forming dynamic wheel balancing units from tubular synthetic plastic materials under such conditions as to maintain true geometrical relationships while eliminating the tendency to shrink when such units are placed in operation.

In U.S. Patent 3,006,690, a dynamic wheel balancer has been disclosed which, in one form, is made of a plastic material. Plastic rings are secured on an automobile wheel and thus near the location of a brake drum. Conditions are such that substantial variations in temperature are encountered. Plastic wheel balancing rings heretofore produced, when exposed to the heat variations present at this site, have been found to undergo substantial shrinkage. When secured to a wheel by clips, the rings are pulled into the clips, distorting the ring and thus rendering it substantially inoperable.

Such rings have been formed commercially by feeding hollow tubular material directly from an extruder onto a circular configuration. Rings thus formed have been found to be subject to the undesirable shrinkage. Furthermore, it has been found that tubular material initially of circular cross section, when formed by prior art techniques, is distorted such that the circular configuration of the tube is altered to an elliptical shape and thus is undesirable in its use as a wheel balance unit.

The present invention provides a new ring for wheel balance purposes which is free from the tendency to shrink. It is maintained substantially circular and is of material as to be of high impact resistance.

More particularly, in accordance with the present invention, there is provided a system for forming a balance ring which comprises means for moving a cured strip of a heat softenable plastic tube through an oven so that the section of tubing leaving the oven is softened. The softened section of tubing is then moved along a relatively short length of heater gun of higher temperature coaxial with the section in the oven. Means are provided for deflecting and directing the section of tube emerging from the gun into a circular path and for irradiating the zone of initial deflection to maintain the zone at a temperature above that of the gun. Means are provided for abruptly cooling the tube after leaving the zone of contact to a temperature which is substantially above ambient temperature but below the temperature of the oven.

In accordance with a further aspect of the invention, there is provided a wheel balance ring preferably of an acrylonitrile-butadiene-styrene polymer which has been subject to at least two cycles of heating and cooling, one of which may be in the extrusion of the tubing and the other of which is in the formation of the tubing into ring-like configuration.

For a more complete understanding of the present invention and for further objects and advantages thereof, reference may now be had to the following description taken in conjunction with the accompanying drawings in which:

FIGURE 1 is an elevation view partially in section of one embodiment of the system for forming tubes in accordance with the present invention;

FIGURE 2 is an enlarged sectional view of the gun of FIGURE 1;

FIGURE 3 is an end view of the unit of FIGURE 1;

FIGURE 4 is an enlarged view of the heater section for the gun of FIGURE 1;

FIGURE 5 is a sectional view taken along lines 5—5 of FIGURE 1; and

FIGURE 6 is a sectional view of a portion of a wheel balancer of the invention.

There will first be described the system shown in the drawings which has been found to be suitable for forming balance rings from tubular stock in such a manner that the ring is of a truly circular configuration with the annulus also circular. In the example which will be described, stock lengths of tubing are fed into the system and are heated in a controlled manner with continuous movement from the heating zone onto a drum on which the rings are formed.

More particularly, the machine shown in FIGURES 1 and 2 is designed to accept tubes of plastic material, such as the tube 10, to preheat tube 10 in an oven 11, to further elevate the temperature of tube 10 in a gun 12, and to form the material into a spiral on a drum 13. Preferably, the material employed will be of the acrylonitrile-butadiene-styrene (ABS) type, manufactured and sold by Borg-Warner Corporation of Chicago, Ill. Such material, of 1-inch outside diameter and 0.125 inch wall thickness, is employed to form rings which are used as dynamic balancers for truck wheels and the like. For this purpose, the material is to be formed into rings of, for example, 21 inches or 23 inches diameter. The problem presented is to form the rings without distorting the circular configuration of the tube itself. As the tube is drawn around the drum, it has a tendency to flatten out. This problem is overcome by the present invention.

Preheat oven 11 is supported by legs 20 and 21 and includes a trough 22. A plurality of heating elements are mounted in the bottom of the trough 22. The walls of the trough are provided with an insulating liner 23. The heating elements may be in the form of light bulbs 24 which radiate heat to warm tube 10 as it is drawn through the oven 11. Transverse bars 25 extend across the oven immediately above the trough 22 to provide supports over which tube 10 is drawn. The transverse bars 25 are each covered with the same material as tube 10, to provide a smooth surface over which tube 10 is drawn. In order to minimize gradients in the heat distribution in the oven 11, a fan 26 is mounted adjacent the input end so that circulation of air will be maintained through the oven. An insulated cover 27 is mounted on hinges over oven 22.

It has been found that ABS polymers of type T, manufactured and sold by Marbon Chemicals of Washington, W. Va., under the trademark Cycolac, are a preferred material for the formation of balance rings. In forming rings of the order of 21 inches to 23 inches in diameter from ABS tube, it has been found satisfactory to operate the oven 11 at a temperature of about 150° to 160° F.

Tube 10 is drawn from oven 11 through a gun 12, and thence into contact with the surface of drum 13. The gun 12 comprises an outer metallic tube 31 through which a perforated tube 32 extends. The tube 32 is centered in the outer tube 31 by means of bolts 33. Four sets of bolts are employed to maintain the tube 32 properly positioned. Each set comprises three bolts served through the wall of tube 31 on 120° spacings. The tube 31 has a groove 40 between bolts 35 and 36. A similar groove 41 is located between bolts 33 and 34.

In the illustration of FIGURE 2, the tube 31 was about 2 inches outside diameter with about 1/16 inch wall thickness, and was formed of metal. The tube 32, formed in one embodiment of Teflon, was about 1½ inches outside diameter with about 1/8 inch wall thickness. The inside diameter of grooves 40 and 41 was about 1 5/8 inches. The tube 32 had a center section 32a of unbroken walls and end sections 32b and 32c which were perforated in a substantially uniform pattern to permit flow of air therethrough. While shown spaced apart, the gun may extend from within the oven.

A heater unit 50 is formed integrally with the tube 31 and includes a motor 51 which drives a squirrel-cage fan 52. A heater section 53 leads from fan 52 to a distributor section 54. The distributor 54 serves to couple the sections 31a and 31b together. Distributor 54 is substantially larger in diameter than the tube 31. The heater section 53 leads to the distributor section tangentially so that air, which is heated as it is driven by fan 52 over a heater in section 53, will enter the distributor and follow a helical path. A deflector unit 55, mounted concentrically with respect to the tube 32, deflects the heated air onto the surface of the tube 32.

The heated air then flows both directions along the unperforated section 32a. The constrictions in the flow paths formed by grooves 40 and 41 force the heated air through the perforations in the end sections 32b and 32c.

In one embodiment, an electric heating element 60, such as shown in FIGURE 4, was employed. The heating element was a 750-watt element 60, spirally wound onto a ceramic bar 61. The bar 61 served to support the heating element 60 at about the axis of the heating section 53, FIGURE 1. The resultant flow of heated air through the perforation in the tube 32 raises the temperature of the tube 10 as it passes through the gun 12 to a temperature of 180° to 190° F.

The temperature in the gun 12 is controlled by means of a thermostatic control. More particularly, a temperature-sensing element 62 is spirally wound onto the outer wall of the tube 32 adjacent to the set screws 36. Element 62 extends to a suitable control element (not shown) of the type well known in the art. The control element opens and closes the power circuit leading to the heater 60 to maintain the temperature of the tube 10 as it passes through the gun 12 at the desired temperature.

As tube 10 issues from gun 12, it is wound onto drum 13. Immediately above the upper surface of the drum 13 is a radiant heating unit 65. The unit 65 includes a pair of linear heating bulbs 66 and a reflector 67. In the installation illustrated, two GE 500-T3 Quartz infrared lamps were employed. They were positioned about horizontal and parallel to the axis of tube 10. The spacing between the bulks 66 and the tube 10 was adjustable on bracket 65a for control of the temperature of the drum 13 and the zone through which the tube 10 passes as it makes contact with the drum. Preferably, the drum contact zone is maintained at a temperature of 200° to 210° F.

The tube 10 as it rolls onto drum 13 passes into a water bath 68 in a tank 69. The water bath 68 is maintained at a temperature of about 140° to 150° F.

The drum 13 is driven from a motor 70 by way of a variable speed transmission unit 71. A belt 73 couples a pulley 74 on the output shaft of the unit 71 to a pulley 75. A pulley 76 on the same shaft as pulley 75 is coupled by belt 77 to a pulley 78 on the shaft common to the drum 13. The drum is driven at a speed of the order of one revolution every four minutes.

The shaft 79, on which the drum is mounted, is coupled by belt 80a to a screw 80. The screw 80 cooperates with a follower 81 mounted on the distributor 54 to move the gun 12 parallel to the axis of the drum 13 so that the tube 10 will lay on drum 13 in a close spiral. The gun 12 is mounted on a pair of rods 82 and 83. More particularly, brackets 84 and 85 support the gun 12 for slide movement on rods 82 and 83, respectively. The rods 82 and 83 are mounted on a movable table 87 which is controlled in position by a screw 88 working in a nut 89 actuated by a crank 90.

The supporting frame for the table 87 includes the legs 95. The table 87, having a depending support 96, is movable vertically along legs 95 under control of a crank 97 so that the gun can be properly positioned relative to the surface of the drum 13. The table 87 is operated at an elevation such that the tube 10, when centered in a gun 12, will be tangent with the surface of the drum 13.

It will be recognized that the size of the drum 13 will be selected for the particular size of ring to be formed. Drums 21 inches and 23 inches in diameter will be satisfactory to make balance rings for trucks. Drums 15 inches and 16 inches in diameter are used for making balancers for pick-up type trucks and other drums, as required, will be employed for manufacture of automobile wheel balancers.

As above indicated, ABS material is preferred. Such material of satisfactory form for truck balancers has been found to have 1 inch outside diameter with 0.125 inch wall thickness. After lengths of tubing of such material are heated and formed as a spiral on drum 13, a power saw, such as represented by the blade 110, FIGURE 1, is moved along a course parallel to the axis 79 in registration with the slot 13a in the drum 13, so that the tube formed on the drum 13 will be cut into separate rings. After the rings are thus produced, they can be more accurately sized, if necessary, by a sizing operation for various wheel dimensions in the range of the drum 13.

After the rings are sized, they are loaded with steel balls, as shown in FIGURE 6. Ring 100 contains balls 101 which preferably are substantially larger than the radius of the ring annulus. After the balls 101 are loaded in the annulus, a quantity of oil 102 is introduced into the annulus, the oil being heated to a substantially elevated temperature. After the ring is loaded with balls and with heated oil, and before the oil is permitted to cool, a sleeve 103 is slipped over the ends of the ring 100, as to bring the ends of the ring into abutting engagement. The sleeve is cemented onto the outer surface of the ring to form a unitary liquid-tight body. As the liquid cools, a partial vacuum is formed in the air space within the ring. The temperature at which the oil initially is placed in the ring is substantially above any operating temperature to be encountered. By this means, under all conditions, a partial vacuum will be present in the ring, thus minimizing the tendency encountered in prior art devices to explode at high temperatures. A suitable oil is of the type sold by Standard Oil of Indiana and designated as Rykon No. 11. This is an industrial-type oil having gravity of 26.2 API and viscosities as follows: at 100° F.: 100–110; at 210° F.: 41.0; and at −30° F.: 0.020.

In a preferred embodiment, a regular (relatively light-duty) truck wheel balancer is of 21 to 23 inches in diameter. Thirty-two (32) 5/8 inch steel balls are inserted.

They span about one-fourth of the circumference of the tube. Oil heated to 185° to 190° F. is then added in quantity such that the oil plus the balls fill the tube about one-half full.

For a heavier-duty truck balancer, forty-two (42) ⅝ inch balls are loaded into the ring, filling about one-third of the annulus. Oil is then added to fill the annulus up to about 50% of the total volume thereof.

It has been found that balance rings made out of a different material, namely, cellulose-acetate-butyrate, while of lower impact strength and thus less desirable than the ABS polymers above-described, may be formed where the temperature range maintained in the oven is from 140° to 150° F., the temperature maintained in the heating gun is from 160° to 170° F., the temperature maintained in the contact zone between the tubing and the drum is 190° to 195° F., and the temperature of the water bath is 130° to 140° F.

While heating elements such as the heater coil unit 60 of FIGURE 4, and light bulbs 24, FIGURE 5, have been described, it will be obvious that other forms of heating elements may be employed. Preferably, the temperatures in the preheat oven and the temperatures in the gun will be maintained in the relationships above described. It is believed that the application of heat at the point at which the tube 10 is deflected onto the drum, as by infra-red radiation, has a desirable effect on the character of the resultant product, and more specifically, the infra-red heat radiation at a temperature higher than that maintained in the gun serves to minimize shrinkage of the balancer when installed on a wheel where it is subject to the same heat conditions as the wheel.

It has been found that plastic tubular balance rings, when formed in accordance with the prior art techniques, undergo shrinkage of around 3% or more when subject to heat variations on a truck wheel. Such shrinkage causes clips, employed to fasten balancers onto the wheel, to sink into the balancer walls and pull the otherwise circular tube into a non-circular configuration. Such action prevents the system from properly balancing the wheel. When formed in accordance with the present invention, shrinkage is substantially eliminated. Difficulties heretofore attendant shrinkage is thus eliminated.

While the invention has been illustrated in connection with forming balance rings, it will now be appreciated that the system of FIGURES 1–5 may be employed to form arcuate sectors less than 360° in extent. That is, as many slots as desirable can be placed on the surface of drum 13 and tubular material softened and rolled thereon into circular configuration. A plurality of cuts may then be made across the tube to form arcuate sections of 45°, 90°, or any other length less than 360°.

Thus, in accordance with the invention, a method of forming a balancer ring includes moving a cured strip of a heat softenable tube through an elongated heated atmosphere to soften the section leaving such atmosphere. The softened section of the tube is then moved through a short path in a heater gun of higher temperature along a line coaxial with the section in the heated atmosphere. The section of said tube emerging at the muzzle of the heater gun is deflected and directed into a circular path. The zone of initial deflection is irradiated with heat to maintain the temperature of such zone above that of the gun. The tube is abruptly cooled after leaving the point of deflection to above ambient temperature and below the temperature of said heated atmosphere, following which it may be cut into single-turn loops of fractions thereof.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for forming rings, each having circular annulus therein, from elongated plastic tubing stock which comprises:
   (a) an elongated oven,
   (b) a heater tube for maintaining an atmosphere within said tube at a temperature higher than the atmosphere in said oven, said tube being aligned with and adjacent to the output of said oven,
   (c) a drum means for anchoring one end of said stock and mounted for rotation on a horizontal axis which is perpendicular to the axis of said oven and said heater tube with the surface of said drum tangent to a line below the center of said tube a distance equal to the radius of said stock,
   (d) guide means extending through said oven and said tube for receiving and guiding said stock to said drum,
   (e) means for driving said drum,
   (f) a radiant heat source for irradiating the zone in which said stock engages said drum, and
   (g) a bath of water encompassing the lower section of said drum heated to a temperature which is below the temperature of said oven.

2. A system for forming tubing, which is rigid at ambient temperatures into rings subsatntially free from distortion, which comprises:
   (a) a preheat oven for establishing temperature above ambient temperatures, a heating gun for establishing an atmosphere therein of temperature above that of said oven, and a radiant energy heat source located in tandem array along a travel path for said tubing, and
   (b) drum means adapted to anchor one end of said tubing mounted for rotation adjacent the muzzle of said gun with the surface of said drum tangent to a line below the center line of said gun a distance about equal to the radius of said tubing for drawing said tubing through said array and onto said drum.

3. The combination set forth in claim 2 in which said path is horizontal, said radiant energy heat source is located above said path, and said drum is mounted on a horizontal axis below said path.

4. The combination set forth in claim 2 in which said drum has at least one longitudinal slot therein to facilitate cutting tubing spiralled thereon into segments no longer than single-turn loops.

5. A system for forming tubing, which is rigid at ambient temperatures, into rings substantially free from distortion, which comprises:
   (a) a preheat oven for establishing temperature above ambient temperatures, a heating gun for establishing an atmosphere therein of temperature above that of said oven, and a radiant energy heat source located in tandem array along a travel path for said tubing,
   (b) drum means adapted to anchor one end of said tubing mounted for rotation adjacent the muzzle of said gun with the surface of said drum tangent to a line below the center line of said gun a distance about equal to the radius of said tubing for drawing said tubing through said array and onto said drum, and
   (c) means for contacting with heated liquid a portion of said drum and any tubing thereon at a location spaced from the point said drum approaches tangency with said center line.

6. A system for forming tubing, which is rigid at ambient temperatures, into rings substantially free from distortion, which comprises:
   (a) a preheat oven for establishing temperature above ambient temperatures, a heating gun for establishing an atmosphere therein of temperature above that of said oven, and a radiant energy heat source located in tandem array along a travel path for said tubing,
   (b) drum means adapted to anchor one end of said tubing mounted for rotation adjacent the muzzle of said gun with the surface of said drum tangent to a line below the center line of said gun a distance about equal to the radius of said tubing for drawing said tubing through said array and onto said drum, and
(c) a water bath inundating a lower portion of said drum and any tubing thereon.

7. The combination set forth in claim 6 wherein the surface of said drum is longitudinally slotted and a cutting means is provided to sever the spiral tubing on said drum into single-turn loops.

References Cited
UNITED STATES PATENTS

| | | | |
|---|---|---|---|
| 1,210,938 | 1/1917 | Hewitt | 18—6 |
| 2,463,288 | 3/1949 | Leguillon | 18—6 X |
| 2,565,003 | 8/1951 | Simorda | 18—6 |
| 2,648,872 | 8/1953 | Stiegler | 18—6 |
| 2,765,441 | 10/1956 | Gambrill | 18—6 X |
| 3,242,528 | 3/1966 | Elder | 18—6 |
| 3,277,525 | 10/1966 | Buschman et al. | 18—6 |

WILLIAM J. STEPHENSON, Primary Examiner

U.S. Cl. X.R.

18—6, 19